(12) United States Patent
Albrecht et al.

(10) Patent No.: US 7,668,994 B2
(45) Date of Patent: Feb. 23, 2010

(54) METHOD FOR OPTIMIZING BANDWIDTH UTILIZATION IN BUS SYSTEMS

(75) Inventors: Andreas Albrecht, Pirk (DE); Dimitri Lomakin, Nürnberg (DE); Günter Steindl, Poppenricht (DE)

(73) Assignee: Siemens Aktiengesellschaft, Munich (DE)

( * ) Notice: Subject to any disclaimer, the term of this patent is extended or adjusted under 35 U.S.C. 154(b) by 246 days.

(21) Appl. No.: 11/494,015

(22) Filed: Jul. 27, 2006

(65) Prior Publication Data
US 2007/0058682 A1 Mar. 15, 2007

(30) Foreign Application Priority Data
Jul. 28, 2005 (EP) .................. 05016465

(51) Int. Cl.
*G06F 13/00* (2006.01)
(52) U.S. Cl. .................. 710/110; 710/305; 713/600
(58) Field of Classification Search ............. 710/110, 710/100, 104, 305–306; 370/563; 713/600
See application file for complete search history.

(56) References Cited

U.S. PATENT DOCUMENTS

| 6,418,349 | B1 * | 7/2002 | Hahn et al. ............... 700/3 |
| 2001/0040947 | A1 * | 11/2001 | Daase et al. .......... 379/114.01 |
| 2004/0141517 | A1 | 7/2004 | Balasubramanian et al. |
| 2005/0114577 | A1 * | 5/2005 | Beckhoff et al. ............ 710/110 |

FOREIGN PATENT DOCUMENTS

| DE | 197 21 740 A1 | 11/1998 |
| WO | WO 2004/071025 A1 | 8/2004 |

OTHER PUBLICATIONS

S. Vitturi, "DP-Ethernet: the Profibus DP protocol implemented on Ethernet", Computer Communications, 2003, pp. 1095-1104, vol. 26, No. 10, XP004425084, Elsevier Science Publishers B.V., Amsterdam, NL.
E. Tovar, F. Vasques, "Cycle time properties of the PROFIBUS timed-token protocol", Computer Communications, 1999, pp. 1206-1216, vol. 22, No. 13, XP004178581, Elsevier Science Publishers B.V., Amsterdam, NL.

* cited by examiner

*Primary Examiner*—Thomas J Cleary
*Assistant Examiner*—Kim T Huynh

(57) ABSTRACT

In accordance to one aspect, a method for optimizing the effective data transmission rate in a bus system, in particular in automation technology is provided. A data telegram used in higher-order data networks based on the Internet protocol, with at least one data telegram, at least one data segment and/or at least one data section being generated and/or modified and/or deleted by at least one slave. The topology of the bus system can hereby be selected according to the application and is taken into account in the configuration of the data contained in the data telegrams, without infringing the protocol characteristics of the higher-order data network. The number of data telegrams required is hereby significantly reduced, in particular on communication links with maximum loading.

17 Claims, 4 Drawing Sheets

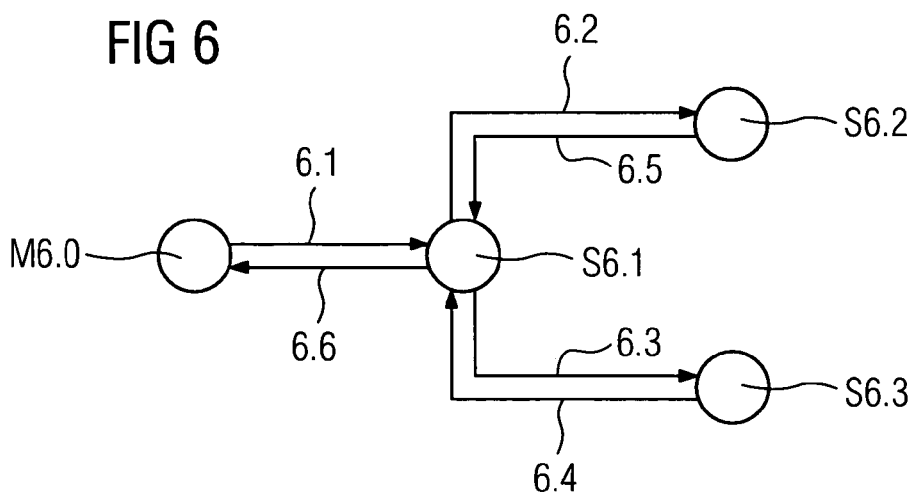
FIG 6
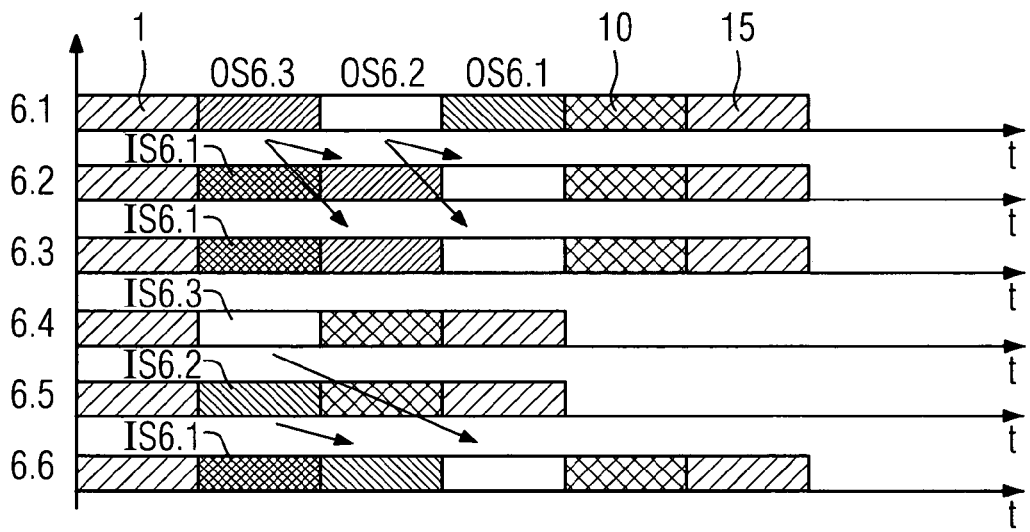
FIG 7
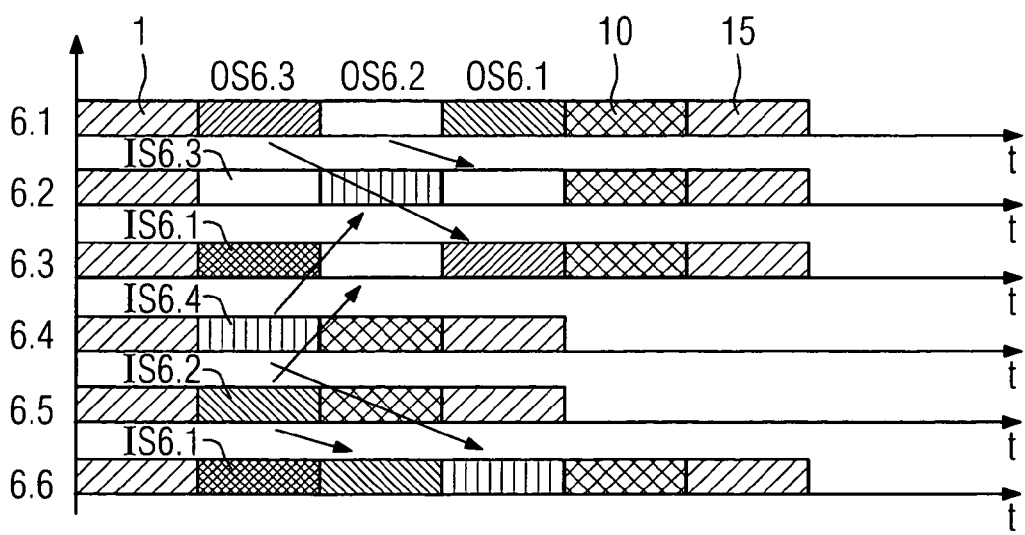

METHOD FOR OPTIMIZING BANDWIDTH UTILIZATION IN BUS SYSTEMS

CROSS REFERENCE TO RELATED APPLICATIONS

This application claims priority of European application No. 05016465.6 EP filed Jul. 28, 2005, which is incorporated by reference herein in its entirety.

FIELD OF INVENTION

The invention relates to a method for optimizing the effective data transmission rate in a bus system, in particular in automation technology, the bus system having a master and at least one slave, data transmission being provided by means of data telegrams of a higher-order data network, in particular a data network based on the Internet Protocol, the data telegram containing a data segment provided for useful data, the data segment for useful data containing at least one data section, provided for the master and/or slaves, the data telegrams being generated and/or modified and/or deleted by the master. The invention also relates to an automation system, which is provided using such a method for optimizing the effective data transmission rate in a bus system with automation devices that communicate with each other.

BACKGROUND OF INVENTION

Such a method is used in bus systems, also referred to as data bus systems, such as fieldbus systems, which are to be Internet Protocol-enabled to guarantee direct data traffic into the Internet, corporate network or similar higher-order data networks, etc, with the bus systems operating on an input/output level, like for example PROFINET or similar systems, which can be used for automation systems. This allows automation components, sensors, actuators or similar technical components for example to be controlled or data to be exchanged directly from the higher-order data network (Internet, etc.).

The term automation system here and in the document as a whole refers to a system which uses technical means to carry out specific operations partially or wholly according to predetermined programs without human intervention. Operations in this context refer for example to manufacturing processes, assembly processes, transport processes, quality control processes, etc., which operate in particular in the industrial environment.

Conversely Internet technologies are also available in the bus system. This technology thus joins the Internet and the bus system together to form a network in a virtual manner for the user, the transparency of the bus system being increased in a sustainable manner in the process.

The most important protocol for network coupling at present is the Internet Protocol, the principal task of which is to provide cross-network addressing. However it does not improve services in the underlying networks or layers to any significant degree. The Internet protocol operates in a connectionless manner by exchanging data telegrams, also referred to as datagrams or frames. Datagrams thereby comprise data packets, provided with an IP header, which contains information relating to length, sender and recipient addresses and protocol designator.

Sender and recipient addresses are specified in 32-bit fields and comprise details of the network and the line located therein. In such cases a datagram comprises an IP header and an IP data field. The IP header contains for example the address of the end recipient. If said end recipient is in a different network from the sender, direct transmission is not possible. Instead a router (also referred to as a gateway in the Internet) in the sender's own network is addressed and this forwards the information based on what are known as routing tables. The encapsulation principle can be used here, with the datagram of the other network being encapsulated in the IP data field, to be "extracted" at the gateway for forwarding in the other network.

A network coupler is known from WO 2004/071025 A1, which is connected on the one hand to a network, on which Ethernet telegrams can be transmitted, and on the other hand to a number of subscribers, who are connected to the network coupler via an internal interface. To exchange data, an Ethernet telegram received via the external interface of the network coupler is forwarded to the internal Ethernet interface of the network coupler and output on the ring transmission path, with each subscriber connected to the interface exchanging the useful data intended for the respective subscriber using the Ethernet telegram circulating on the ring transmission path.

SUMMARY OF INVENTION

An object underlying the invention is to enhance effective bandwidth utilization during data transmission in bus systems based on an Internet Protocol, in particular in the field of automation technology.

This object is achieved by the independent claims.

It allows the data in the data segments and/or the data sections contained therein to be configured in the data telegram, as a result of which the topology of the bus system can be taken into account to achieve an effective data transmission rate. Also a higher effective data transmission rate can be achieved by time synchronization with the aid of the data telegrams themselves instead of with synchronization telegrams provided specifically for the purposes of synchronization.

The invention is based on the knowledge that Ethernet technology is becoming increasingly important in automation technology. The coupling of a few processing units, also referred to as masters, and a large number of peripheral units, also referred to as slaves, is characteristic of communication structures in automation technology. The data volume per slave is very small but the transmission frequency is very high. Under such conditions the negative aspects of the protocol characteristics of Ethernet become apparent. The bus system is thus Ethernet-enabled but at the expense of the effective data rate. The effective data rate decreases, due to the minimum length of an Ethernet frame and due to the prescribed address and status information, which is part of what is known as the overhead not the useful data. The communication links, which either go to the master or from the master, are particularly affected and prove to be a bottleneck in communication throughput. There are solutions to the bottleneck problem but these violate Ethernet requirements during transmission. It is therefore not possible to use or incorporate Ethernet standard components there without additional outlay.

With the method for optimizing the effective data transmission rate in a bus system, it is possible for a subscriber to generate and/or modify and/or delete at least one data segment and/or at least one data section. Bus system subscribers here include the master, which predetermines the clock pulse of the bus system and which also communicates with a higher-order network, for example the Internet. Within the bus system the master predetermines the clock pulse but apart from this feature it has the same rights as a slave in respect of generating, modifying and deleting data telegrams. It is thus possible to optimize the optimization of the effective data rate in respect of the respective structure or topology of the bus system. Tailoring to the respective topology results in a specific subdivision of the data segment of the useful data of the data telegram, which can be determined in a different manner for each transmission from one subscriber to the next. This makes the method extremely flexible and allows it to be used on a large number of topologies, e.g. linear, ring, star-shaped and possible combinations thereof.

An automation system with automation devices communicating via a bus system, with a first automation device being configured as the master and at least a second automation device being configured as the slave, benefits from at least one slave to generate and/or modify and/or delete at least one data telegram, at least one data segment and/or at least one data section, in such a manner that the effective data rate of the bus system is increased and the automation devices can be inspected or controlled more quickly. This avoids unprofitable waiting periods, during which the automation devices wait for control commands, and results in a significant production increase.

The data telegram is given a so to speak circular letter character in the bus system, it being possible for the readers or neighbors or slaves to modify the circular letter. This method can also be used in the converse direction (from slave to master), with each subscriber adding their data and forwarding the data telegram with the parts that are not of relevance to them. The structure of the part of the data telegram provided for the useful data is tailored to the respective topology.

The effective data transmission between subscribers can be further optimized by the clock pulse synchronization of the method. According to the method the respective send times of the individual subscribers are coordinated such that the data of the adjacent slave arrives in each instance at the optimum time for its own send process. It is thereby also possible to forward error information, if the data telegrams do not arrive on time. The fieldbus system can optimize the send times of the respective neighbors based on the error information. The data telegrams are used for optimization purposes. The aim is to refine and then maintain the time synchronization of the relevant components during operation, after a run-up with relatively rough synchronization. For the individual components this means that when a frame, which originates from a component with higher-order time, is received, this time is compared with the target time and its own clock is corrected correspondingly. The higher-order time of the other component or neighbor is hereby read from the received Ethernet frame. The higher-order time is thereby known through configuration. It is possible for every possible topology of the fieldbus system to define a neighbor for every subscriber, said neighbor predetermining the time for the said subscriber. This establishes a time hierarchy among the subscribers, which makes it possible to go over to time-synchronous mode at any time from any initial situation of the control bus system. According to the invention the second method is directly dependent on the first method, as it requires the above-mentioned, higher-order time, also referred to as a time stamp, of the neighbor for actual synchronization, with the time stamp having to be provided within the useful data of the Ethernet frame.

The described method results in a significant reduction in the number of data telegrams or frames, particularly on the critical link directly adjacent to the processing unit (master) (ideally to one data telegram) and the protocol-related disadvantages are thus dramatically reduced. A further advantage of time synchronization is the resulting very short equidistant transmission cycle, in addition to the high level of bandwidth efficiency.

One advantageous embodiment of the method for optimizing the effective data transmission rate in a bus system is a method, wherein a subscriber transmits the data telegram to the adjacent subscriber. When networking adjacent subscribers, the shortest possible distances are covered, the resulting topology being secondary. The topology is then taken into account in the data telegram. Long transmission paths that only results with a specified topology (ring, linear, etc.) do not have to be taken into account. This minimizes the transit times of the data telegrams between subscribers.

As a subscriber does not address the end recipient directly, always simply addressing its adjacent subscriber on the path to the end recipient, shared use of the data telegram reduces the number of data telegrams drastically. Ideally to one data telegram per link. This reduction in the number of data telegrams has a positive impact, particularly on the links to the master, also referred to as the processing unit.

A further advantageous embodiment is a method, wherein the slave stores measurement data and/or status data and/or control commands and/or process data in at least one data section of the data telegram. In other words it is possible to communicate with other subscribers or even to use their assigned data section in the data telegram in a shared manner if required. Data configuration is thus not simply dependent on topology but can also be based on other aspects of automation technology.

A further advantageous embodiment is a method, wherein the topology of the bus system is configured at least partially as a linear, ring, and/or tree-type structure. The topology can hereby be selected according to criteria other than the positions of subscribers in relation to each other. For example, depending on the application, a tree-type, presorted topology can result in fast contact with a specific subscriber.

In a further advantageous embodiment the data telegrams are used for clock pulse synchronization of the bus system. Equidistant transmission cycles can be achieved by means of time synchronization. The use of the configurable data telegram for time synchronization means that additional data telegrams are not required for synchronization during operation. Every subscriber is able to compare their own clock pulse with that of the adjacent subscriber and time synchronization with the master is possible taking into account the fixed data telegram transit times between subscribers. Subscribers first execute clock pulse detection and then their own time synchronization.

Further advantageous embodiments and preferred developments of the invention will emerge from the dependent claims.

BRIEF DESCRIPTION OF THE DRAWINGS

The invention is described and explained in more detail below with reference to the exemplary embodiments illustrated in the figures, in which:

FIG. 6 shows a fieldbus system of star-shaped topology of a third exemplary embodiment, FIG. 7 shows data telegrams for the third exemplary embodiment from FIG. 6.

DETAILED DESCRIPTION OF INVENTION

Figure 1:
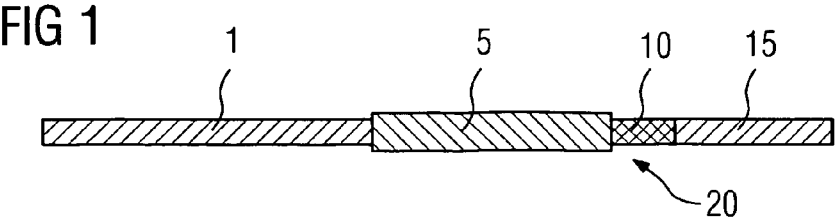
FIG. 1 shows a time structure of a conventional Ethernet data telegram.

FIG. 1 shows a time structure of a conventional Ethernet data telegram, as used by most Internet protocol-based networks. The first data segment is what is known as the header (HDR) 1, containing the Ethernet destination address as well as the Ethernet source address. This is followed by the data segment 5 of the useful data, which can contain 46 to 1500 bytes. Then follows a data segment 10, taking up a total of four bytes and containing what is known as the checksum (CRC). This checksum is created by the sending subscriber, by carrying out a CRC calculation over the entire bit sequence of the preceding data segments. This allows the recipient to verify the content of the CRC checksum using the same calculation. If the values do not correspond, the recipient assumes incorrect transmission and the frame is rejected. The fourth data segment 15 contains zeros and ones used for what is known as collision detection. The data segments 1, 10 and 15 are generally referred to as the overhead in contrast to the data segment 5 of the useful data.

Figure 2:
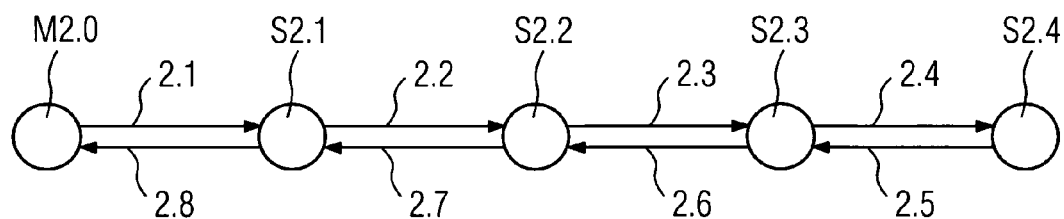
FIG. 2 shows a fieldbus system of linear topology of a first exemplary embodiment.
Figure 3:
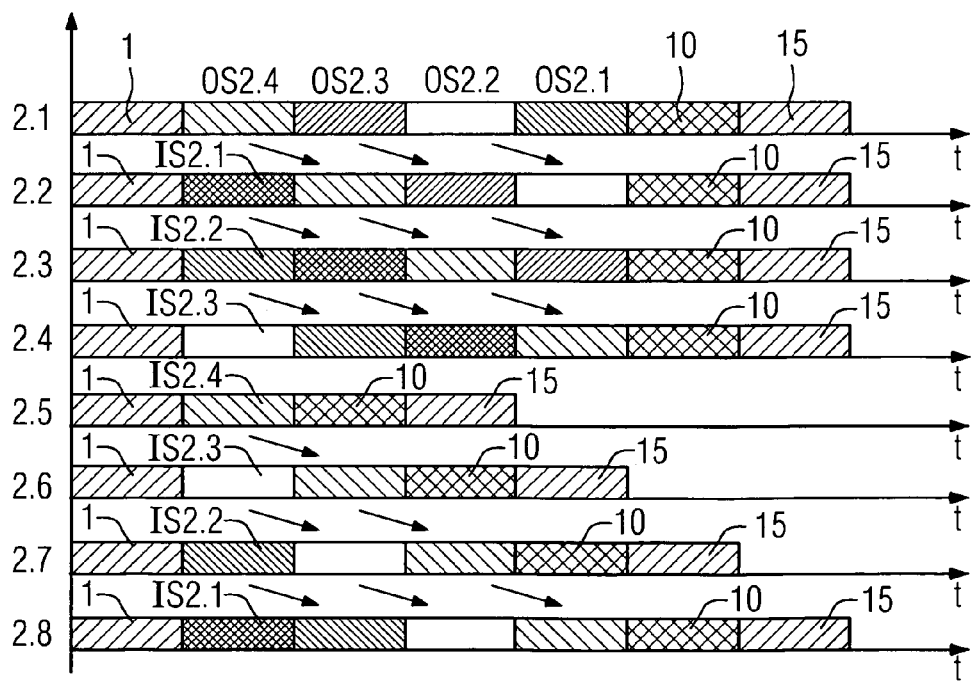
FIG. 3 shows data telegrams for the first exemplary embodiment from FIG. 2.

FIG. 2 shows a fieldbus system of linear topology of a first exemplary embodiment with a master M2.0 and four slaves (S2.1, S2.2, S2.3 and S2.4). FIG. 2 should be considered in conjunction with FIG. 3, with FIG. 3 showing the data telegrams used in the topology in FIG. 2. It is assumed that all five subscribers, i.e. the processing unit (master) and the four peripheral units (slaves) start to send data telegrams at the same time. In practice start points with a time offset can be agreed. The data segment 5 provided for useful data is subdivided in this exemplary embodiment. The neighbors of the higher-order time are first determined in the linear topology. It is advantageous to take the left neighbor as reference in each instance. In other words, more specifically, the relevant slave or subscriber S2.1 aligns itself with the clock pulse of the master M2.0 and the subscriber S2.2 aligns itself with the clock pulse of its neighbor S2.1 etc. The time hierarchy is therefore determined as a function of the topology of the fieldbus system.

FIG. 3 shows data telegrams for the first exemplary embodiment from FIG. 2. The data sections arranged within the data segment 5 of the useful data can have the letter 0 for output or 1 for input. Output and input always relate here, and in the following figures, to the master. In the data segments 1, 10 and 15 the overhead is combined. The data segment of the useful data 5 is divided into four data sections (OS2.4, OS2.3, OS2.2 and OS2.1) in this example. These sections contain information, commands or data, which are sent by the master M2.0 to the respective slave. OS2.4 here refers to the output to the subscriber S2.4 and OS2.3 refers to the output to the subscriber S2.3, etc. The data telegram with the reference 2.1 is sent by the master to the subscriber S2.1.

The subscriber S2.1 extracts from the data telegram the data that is in the section OS2.1 intended for it. It also adds a new section with the reference IS2.1 containing input data for the master M2.0. The data sections are hereby displaced cyclically within the data segment 5 of the useful data. The reference IS2.1 refers to an input (input data) from the subscriber S2.1 from the point of view of the master M2.0. The subscriber S2.2 proceeds in the same manner and extracts the data of the section OS2.2 and adds a new section IS2.2 with new input data. The data telegram 2.5 only contains input data in the section IS2.4. The subscriber S2.3 uses the data of this section IS2.4 further and adds a further section IS2.3 to the data telegram. The subscribers S2.2 and S2.1 also proceed in the same manner. The master M2.0 thus receives a data telegram with four sections containing input data from the four subscribers respectively. Only one data telegram is sent per cycle at a point to point connection, so what is known as the overhead only occurs once. This significantly improves bandwidth utilization. Interestingly the cross-traffic occurring with line topology does not influence cycle time. Also the otherwise normal transfer delays in the nodes are unimportant. Therefore what are known as full duplex connections can be utilized optimally.

Figure 4:
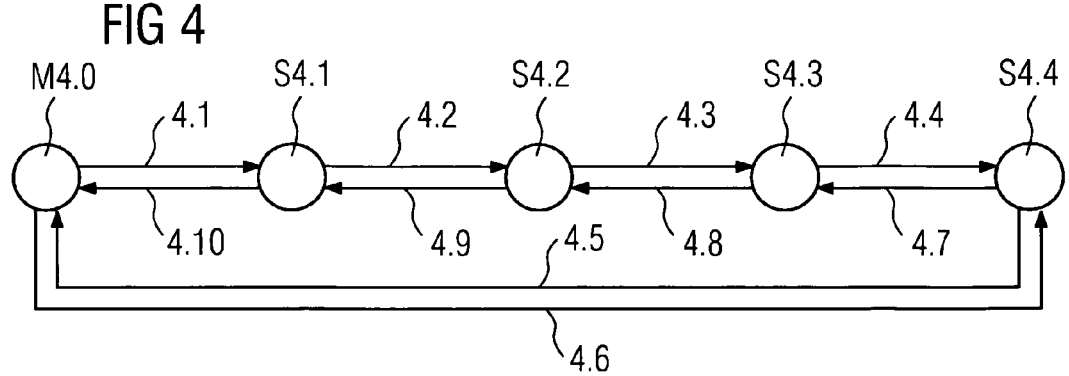
FIG. 4 shows a fieldbus system of circular topology of a second exemplary embodiment.

FIG. 4 shows a fieldbus system of circular topology of a second exemplary embodiment. The fieldbus system comprises five subscribers, one being a master M4.0 and four being slaves S4.1, S4.2, S4.3 and S4.4. The data telegrams exchanged between the individual subscribers are assigned references 4.1 to 4.10 and are described in detail in FIG. 5.

Figure 5:
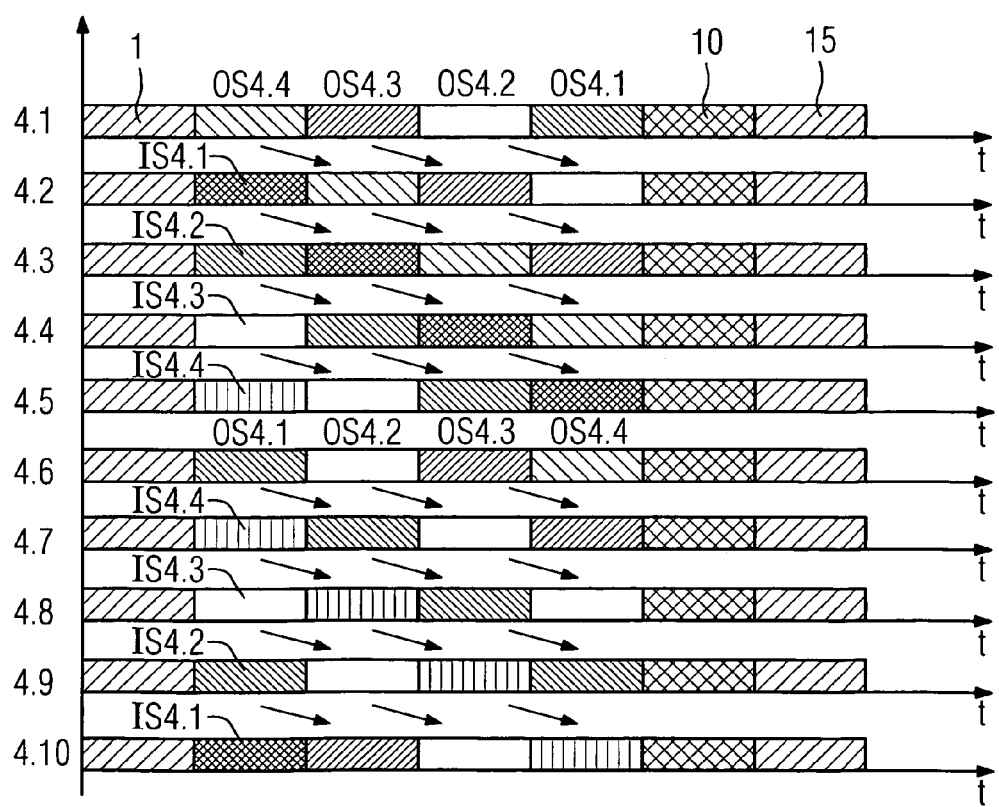
FIG. 5 shows data telegrams for the second exemplary embodiment from FIG. 4.

FIG. 5 shows data telegrams for the second exemplary embodiment from FIG. 4. The data telegrams 4.1 to 4.5 originate in a similar manner to the first data telegrams in the first exemplary embodiment in FIG. 3. The essential difference is that the master M4.0 now has two neighbors, so it can direct a data telegram in both directions. Therefore the data telegram 4.6, sent by the master M4.0 to the subscriber S4.4, has the same structure as the data telegram 4.1. This means that the telegram 4.6 is handled in the same manner, only anti-cyclically, as the data telegram 4.1. Each subsequent subscriber extracts the data from the section allocated to them and adds data, which is to be sent by the respective subscriber to the master M4.0. This also means that the master receives two data telegrams with the same input content. This can create the necessary redundancy for security purposes, for example in the event that a subscriber should fail and break the ring. Also data in the circular topology is available more quickly than in the linear topology of exemplary embodiment 1.

FIG. 6 shows a fieldbus system of star-shaped topology of a third exemplary embodiment. In this example there is a master M6.0 and three slaves S6.1, S6.2 and S6.3. The time hierarchy is clearly predetermined in this exemplary embodiment. The subscriber S6.1 aligns itself with the data telegram inputs of the master M6.0 and the subscribers S6.2 and S6.3 align themselves with the subscriber S6.1.

FIG. 7 shows data telegrams for the third exemplary embodiment from FIG. 6. Two diagrams show two possible structures of the data diagrams to be used for the star-shaped topology in FIG. 6. As in the preceding figures, the data segments 1, 10 and 15 refer to what is known as the overhead. The data segment 5 of the useful data is divided as a maximum into three sections in the third exemplary embodiment. According to the top diagram in FIG. 7 the subscriber S6.1 receives the data telegram 6.1 from the master M6.0. The subscriber S6.1 extracts the data or section OS6.1, intended for it. When generating the data telegrams 6.2 and 6.3 it also adds a section IS6.1 of the input data for the master M6.0. In other words, 6.2 and 6.3 are identical in this exemplary embodiment. The subscribers S6.2 and S6.3 respectively transmit the data telegrams 6.4 and 6.5, which only contain one section IS6.3 or IS6.2 in the data segment 5 of the useful data. The subscriber S6.1 integrates both sections from the telegrams 6.4 and 6.5 into the data telegram 6.6, adding a new section IS6.1. Bandwidth utilization is improved significantly in this example too, in that the overhead only occurs once. Also the cross-traffic occurring with this cyclical topology does not influence the cycle time. Also the transfer delays of the nodes are unimportant, so full duplex connections can be supported optimally.

Figure 8:
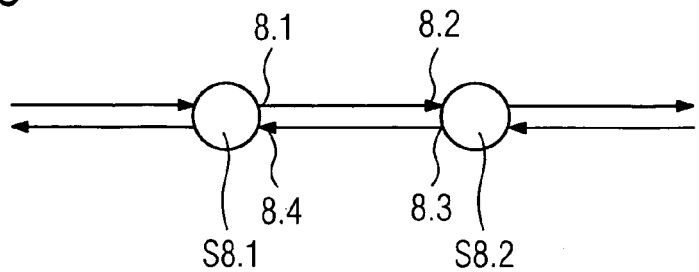
FIG. 8 shows two subscribers of a fieldbus systems of a fourth exemplary embodiment.

FIG. 8 shows two subscribers of a fieldbus system of a fourth exemplary embodiment. The subscriber S8.1 is the time reference for the subscriber S8.2 here. This fourth exemplary embodiment does not relate to a particular fieldbus topology but focuses on the method for time synchronization of two adjacent subscribers. It is also assumed that the subscriber S8.1 is synchronized optimally with the fieldbus system or master (not shown). The time sequence of data telegrams sent is shown in FIG. 9.

Figure 9:
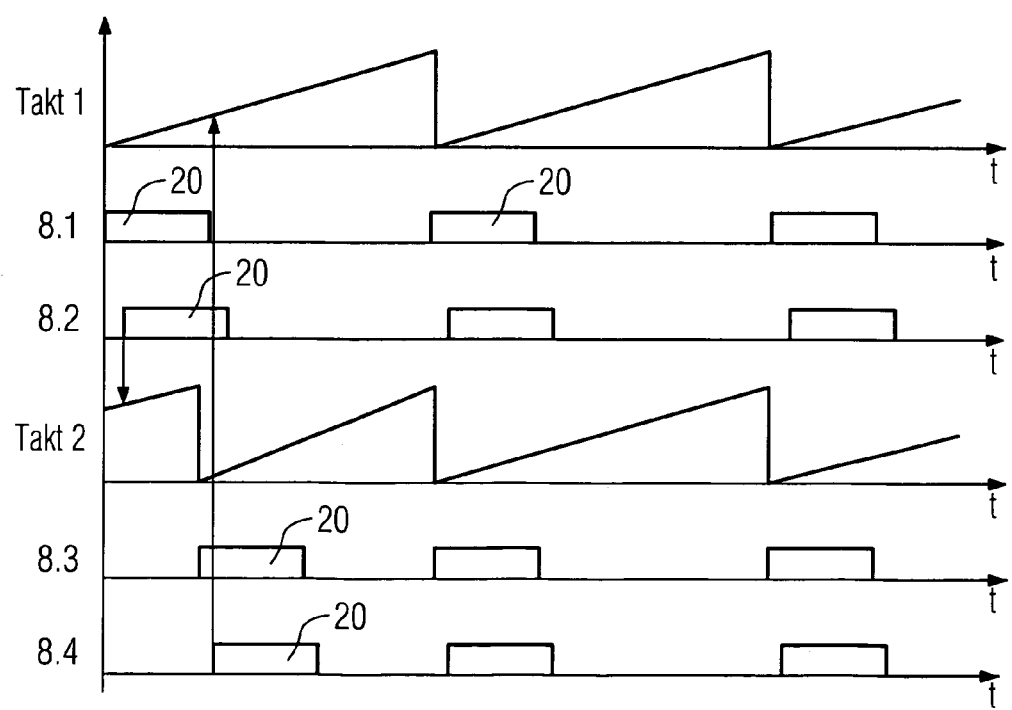
FIG. 9 shows a possible time sequence of a synchronization process for the data telegrams of the two subscribers in the fourth exemplary embodiment shown in FIG. 8.

FIG. 9 shows a possible time sequence of a synchronization process for the data telegrams or clock pulse of the two subscribers of the fourth exemplary embodiment shown in FIG. 8. As the subscriber S8.1 is higher in the clock pulse hierarchy than the subscriber S8.2, the subscriber S8.1 is considered to be already fully synchronized with the system clock pulse or with the master clock pulse. The clock pulse of the subscriber S8.1 should therefore be seen by way of example as a reference for the subscriber S8.2. Both subscribers measure the time difference between transmission of their own data telegram 20 and receipt of the data telegram 20 from their neighbor. For transmission of the data telegrams 20, both subscribers follow their own counter or their own clock beat (referred to in FIG. 8 as "Clock pulse 1" and "Clock pulse 2") and store the counter reading at the time of receipt of the data telegram from their neighbor. These times are marked with arrows in FIG. 8. The actual transmission time of the telegrams between the two subscribers is also taken into account for the subsequent clock pulse correction. The information thus obtained about the time difference of the clock pulses is notified to the respective neighbor in the data segment of the useful data 5 of the data telegram 20. The hierarchically lower-order subscriber S8.2 extracts its correction information from this. Once the subscriber S8.2 has the correction information, it forces premature clocking compared with its own clock pulse, thereby synchronizing with the clock pulse of the adjacent subscriber S8.1. This method assumes that the subscribers send their real-time data telegrams at the same time or with a fixed time offset in respect of each other (isochronous operation, as for example with ProfiNET IRT). The fixed time offset, due to transmission between the subscribers, can hereby be measured by the subscribers themselves, or by transmission of the data telegrams 20. All the subscribers measure the time difference between the transmission of their own telegram to a port and the arrival of the telegram at the same port (in the case of full duplex links). This measured difference is transmitted in the current data telegram and disseminated in this manner in the same clock pulse through the entire clock domain. Every subscriber can thus determine their own actual time difference in relation to the master and correct it or readjust it accordingly. No synchronization telegrams are required with this method, so there is no additional load on the bus. Also a very high level of temporal accuracy can be achieved, as the information required for the adjustment is available in very up to date form in the current cycle.

To summarize, the invention relates to a method for optimizing the effective data transmission rate in a bus system, in particular in automation technology, it being possible to use the data telegram used in higher-order data networks, based on the Internet protocol, with at least one data telegram, at least one data segment and/or at least one data section being generated and/or modified and/or deleted by at least one slave. The topology of the bus system can hereby be selected according to the application and is taken into account when configuring the data contained in the data telegrams, without infringing the protocol characteristics of the higher-order data network. The number of data telegrams required is hereby significantly reduced, in particular on communication links with maximum loading.

The invention claimed is:

1. A method for optimizing an effective data transmission rate in a bus system within an automation system, the bus system having a master device and a plurality of slave devices, the method comprising:
   providing data transmission via data telegrams based on an Internet protocol, each data telegram having a user-data segment, the user data segment having input-output data sections;
   changing the data telegram by the master device by shifting input-output data sections, by at least one of reading, deleting, and modifying an input-output data section intended for the master device, and by at least one of generating and modifying an input-output data section intended for one of the slave devices,
   at the master device, addressing the data telegram to an adjacent slave device;
   changing the data telegram by one of the slaves devices by shifting input-output data sections, by at least one of reading, deleting and modifying an input-output section intended for the slave device, and by at least one of generating and modifying an input-output data section intended for the master device;
   at the slave device, addressing the data telegram to an adjacent slave device or to an adjacent master device;
   ordering the input-output data sections of the data telegram responsive to a physical topology of the bus system and responsive to addressing the data telegram to an adjacent master device or to an adjacent slave device; and
   wherein one of the slave devices transmits the data telegram at the same time as an adjacent slave device transmits a data telegram and one of the slave devices receives the data telegram at the same time as an adjacent slave device receives a data telegram based on alignment of a clock pulse of the master device and each slave device with the clock pulse of an adjacent master device or an adjacent slave device.

2. The method as claimed in claim 1, wherein the master device transmits the data telegram to the slave device.

3. The method as claimed in claim 1,
   wherein the master device stores control commands or process data in the input-output section,
   wherein the slave device reads the control commands or the process data from the input-output section of the data telegram, and
   wherein the slave device stores measurement or status data in the input-output section.

4. The method as claimed in claim 1,
   wherein the bus system has a plurality of slave devices,
   wherein the user-data segment includes a plurality of input-output sections,
   wherein the arrangement of the plurality of input-output sections is based on a topology of the bus system.

5. The method as claimed in claim 4, wherein a configuration of the topology is in accordance that at least a portion of the configuration selected from the group of linear, ring and tree-type structure.

6. The method as claimed in claim 4,
wherein the slave device transmits the data telegram to a slave device that is adjacent in terms of a topology of the bus system or transmits to the master device, and
wherein the master device transmits the data telegram to the slave device.

7. The method as claimed in claim 1, wherein the bus system has a topology configuration such that at least a portion of the configuration selected from the group of linear, ring and tree-type structure.

8. The method as claimed in claim 1, wherein the slave device defines a difference between a clock pulse of the slave device and a clock pulse of the master device, the difference based on a data telegram transit time.

9. The method as claimed in claim 8, wherein the difference is further based on a data telegram arrival time and the clock pulse of the slave device.

10. The method as claimed in claim 1, wherein the slave device automatically corrects a difference between a clock pulse of the slave device and a clock pulse of the master device.

11. The method as claimed in claim 1, wherein the data telegram is used for clock pulse synchronization of the bus system.

12. An automation system with automation devices communicating via a bus system, comprising:
   a master automation device;
   a plurality of slave automation devices communicatively coupled to the master automation device;
   a data transmission via a data telegram based on an Internet protocol, the data telegram having a user-data segment, the user data segment having input-output data sections;
   wherein the master device handles data telegram functions by shifting input-output data sections, by at least one of reading, deleting, and modifying an input-output data section intended for the master device, and by at least one of generating and modifying an input-output data section intended for one of the slave devices;
   wherein the master device addresses the data telegram to an adjacent slave device;
   wherein one of the slave devices handles input-output functions by shifting input-output sections, by at least one of reading, deleting, and modifying an input-output section intended for the slave device, and by at least one of generating and modifying an input output data section intended for the master device;
   wherein one of the slave devices addresses the data telegram to an adjacent slave device or to an adjacent master device;
   wherein the input-output data sections of the data telegram are ordered responsive to a physical topology of the bus system and responsive to addressing of the data telegram to an adjacent master device or to an adjacent slave device; and
   wherein one of the slave devices transmits the data telegram at the same time as an adjacent slave device transmits a data telegram and one of the slave devices receives the data telegram at the same tie as an adjacent slave device receives a data telegram based on alignment of a clock pulse of the master device and each slave device with the clock pulse of an adjacent master device or an adjacent slave device.

13. The automation system as claimed in claim 12, wherein the input-output section includes a measurement data or a status of the slave device.

14. The automation system as claimed in claim 12, wherein the input-output section includes control commands or process data for the slave device.

15. The automation system as claimed in claim 12, wherein the user-data segment includes a plurality of input-output sections, and wherein an arrangement of the input-output sections is in accordance to a topology of the bus system.

16. The automation system as claimed in claim 15, wherein a linear, ring or tree-type structure is provided at least partially for the topology of the bus system.

17. The automation system as claimed in claim 12, wherein the data telegram is provided for a clock pulse synchronization of the bus system.

* * * * *